(12) United States Patent
Figuly

(10) Patent No.: US 6,774,158 B2
(45) Date of Patent: Aug. 10, 2004

(54) PROCESSING OF POLYHYDROXYALKANOATES USING A NUCLEANT AND A PLASTICIZER

(75) Inventor: Garret D. Figuly, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 137 days.

(21) Appl. No.: 10/102,093

(22) Filed: Mar. 20, 2002

(65) Prior Publication Data

US 2003/0181555 A1 Sep. 25, 2003

(51) Int. Cl.[7] .............................. C08K 5/11; C08K 5/12; C08L 67/04
(52) U.S. Cl. .................... 523/124; 264/176.1; 264/211; 264/464; 264/478; 428/220; 524/314; 524/315; 524/599
(58) Field of Search ...................... 523/124; 264/176.1, 264/211, 464, 278, 478; 428/220; 524/314–315, 599

(56) References Cited

U.S. PATENT DOCUMENTS

| | | | |
|---|---|---|---|
| 4,536,531 A | | 8/1985 | Ogawa et al. |
| 4,900,299 A | * | 2/1990 | Webb ........................ 604/11 |
| 5,061,743 A | | 10/1991 | Herring et al. |
| 5,296,521 A | | 3/1994 | Gilmer et al. |
| 5,534,616 A | * | 7/1996 | Waddington ............... 528/503 |
| 5,618,855 A | * | 4/1997 | Noda ........................ 521/189 |
| 5,653,930 A | * | 8/1997 | Noda et al. ............... 264/176.1 |
| 5,939,467 A | * | 8/1999 | Wnuk et al. ............... 523/128 |
| 6,515,054 B1 | * | 2/2003 | Matsushita et al. ......... 524/167 |
| 6,548,569 B1 | * | 4/2003 | Williams et al. ........... 523/124 |
| 2003/0040695 A1 | * | 2/2003 | Zhao et al. ................ 604/15 |
| 2003/0191210 A1 | * | 10/2003 | Autran ..................... 523/105 |

FOREIGN PATENT DOCUMENTS

| | | |
|---|---|---|
| EP | 0291024 B1 | 2/1994 |
| WO | WO 91/19759 A1 | 12/1991 |
| WO | WO 99/05208 A1 | 2/1999 |

* cited by examiner

Primary Examiner—Peter Szekely
(74) Attorney, Agent, or Firm—Gerald E. Deitch

(57) ABSTRACT

The present invention is directed to a polyhydroxyalkanoate copolymer composition that can be readily and quickly processed into extruded and molded articles and film-based products. More specifically, the invention pertains to melt processing of polyhydroxyalkanoates which contain a novel combination of nucleant and plasticizer for enhancing crystallization rates thus causing improved processibility.

1 Claim, No Drawings

PROCESSING OF POLYHYDROXYALKANOATES USING A NUCLEANT AND A PLASTICIZER

FIELD OF THE INVENTION

This invention relates to the field of polyhydroxyalkanoate polymers, articles made therefrom and melt processing methods. More specifically, the invention pertains to melt processing and cast film extrusion of polyhydroxyalkanoates which contain a novel combination of nucleant and plasticizer for enhancing chain mobility, crystallization rates in order to improve processibility in conventional melt processes.

BACKGROUND OF THE INVENTION

Polyhydroxyalkanoates (PHAs) and other thermoplastic polyesters represent potential raw materials for a myriad of useful products. Examples include melt-spun fibers from which non-woven products can be produced for medical gowns and masks, blown and cast films for compostable grocery and garbage bags, injection-molded bottles for health and personal care products and extrusion coatings on paper/paperboard for biodegradable/compostable fast-food containers. In the processes to produce PHA products, it is crucial to achieve line speeds, cycle times, and other processing parameters that are economically desirable.

Polyhydroxyalkanoate copolymers are extremely sticky when melt processed due, at least in part, to extremely slow crystallization rates of their crystalline phase domains. This sticky or "tacky" behavior leads to an inability to process the polymer through any melt processing equipment, including extrusion, compounding, film and fiber operations. Unmodified polymer has a strong tendency to stick to all pieces of machinery, regardless of the material of construction. The polymer also has a strong tendency to stick to itself and to human skin when touched. The stickiness or tackiness gradually disappears in a matter of minutes to hours. However, this time frame is significantly long for any conventional processing techniques, which generally require the polymer to become non-tacky within a matter of a few seconds.

Previous work has shown that addition of a crystallization nucleant to some compositions of polyhydroxyalkanoate copolymers can increase crystallization rates to a point where melt processability is acceptable. In addition, such nucleants can sometimes improve the physical and mechanical properties of the processed articles. Conventional nucleating agents include, for example, talc, micronized mica, calcium carbonate, boron nitride (see, for example, EP 0291024) and ammonium chloride (see, for example, WO 9119759).

U.S. Pat. No. 5,296,521 describes polyester compositions having increased crystallization rates comprising thermoplastic polyester resins and 0.5 to about 5 weight percent of nucleating agent of the formula $RO[P(O)(Ph)(CH_2)_mO]_nH$ where R is an alkali or alkaline earth metal; m is 1, 2, or 3; n takes an average value within the range of 1 to 5. The nucleating agent can be optionally mixed with the acid or ester form providing at least 50 mole percent of the nucleating agent is in the salt form. The nucleating agent is preferably in the form of the sodium salt (e.g., sodium salt of hydroxymethylphenyl phosphonic acid or sodium salt of oligomethylene phenyl phosphinic acid).

U.S. Pat. No. 4,536,531 describes use of carboxylic salts of metals of Group I and II in the Periodic Table as nucleating agents for polyesters exemplified by metal salts of aliphatic monocarboxylic acids such as acetic acid, propionic acid, caproic acid, palmitic acid, stearic acid, oleic acid, behenic acid and montanic acid. Suitable metals are sodium, potassium, lithium, magnesium, calcium, barium and zinc. In these carboxylic acid salts, it is unnecessary that all the carboxylic groups be converted into salt form, but a part of the carboxyl group may be in a salt form and the remaining groups may be in a free acid or ester form.

Several references disclose the use of organophosphorous compounds as nucleants. U.S. Pat. No. 5,061,743 discloses a preferred polyhydroxyalkanoate nucleant made by dry blending cyclohexylphosphonic acid and zinc stearate with polyhydroxybutyrate-co-valerate. The nucleant is disclosed as particularly advantageous for the nucleation of polyhydroxybutyrate-co-valerate having high hydroxyvalerate content. WO 9905208 discloses that organophosphorous compounds having at least two phosphonic acid moieties can be used as nucleants for polyhydroxyalkanoates and other thermoplastic polyesters.

Although many of these compounds have shown effectiveness in increasing the nucleation density of polyhydroxyalkanoate, and therefore crystallization rates, certain disadvantages have been associated with their use. Dispersion of particulate nucleants, for example, has been problematic because agglomeration frequently occurs during processing which can generate regions of stress concentration and inhomogeneity in molding. In addition, nucleants such as boron nitride have been found to act as pigments in some situations, particularly in films and injection moldings, giving rise to opaque products where transparent products are generally desired. Further, some nucleant systems include constituents which may be environmentally and toxicologically undesirable.

Furthermore, the polymers of the previous references tend to be copolymers that do not contain a comonomer that effectively increases the amorphous character or decreases crystallization rates of the polymer. The resulting polymers are often brittle and lead to undesirable properties. Polyhydroxyalkanoate copolymers that contain more modifying comonomers, which lead to a significant amount of amorphous phase, tend to be more desirable polymers because they exhibit a high level of toughness and elastic resilience. However, the large amount of amorphous phase contained in these polymers is not conducive to good crystal formation or rapid crystallization rates. Furthermore, addition of nucleants to these polymers generally does not increase the amount of crystallization or the crystallization rate enough to make melt processing of these polymers feasible. Thus, there is a need for benign and cost-effective nucleant systems which allow for the production of polyhydroxyalkanoate resins having moderate to high crystallinity, excellent moldability, mechanical strength and dimensional stability.

The problem to be solved, therefore, is to provide a polymeric composition that produces tough, flexible polyhydroxyalkanoates that can be readily and quickly processed into film-based products. Another objective of this invention is to provide a method for continuous melt extrusion of these polyhydroxyalkanoates. Yet another object of the present invention is to provide a method for continuous cast film production using these polyhydroxyalkanoates.

SUMMARY OF THE INVENTION

The invention provides a polyhydroxyalkanoate copolymer composition which can be processed into film-based products, extruded and molded articles, and coatings, comprising: (a) a polyhydroxyalkanoate copolymer; (b) a nucleant; and (c) a plasticizer, and a method of making same.

In a preferred embodiment, unique combinations of either poly-3-hydroxy(butyrate-co-octanoate) or poly-3-hydroxy (butyrate-co-hexanoate) are polymerized with polyhydroxybutyrate (nucleant) and either methyl laurate or dibutylmaleate (plasticizer).

DETAILED DESCRIPTION OF THE INVENTION

Applicants have solved the problem by providing combinations of nucleant and plasticizer to polyhydroxyalkanoate ("PHA") copolymers. Addition of the nucleant and plasticizer to PHA copolymers allows crystallization processes to occur in a time frame which enables practical melt processing. The instant invention is applicable to any situation in which accelerated crystallization rates are desired. In particular, the nucleants and plasticizer are used for improved production of PHA and other thermoplastic polyester products by decreasing the cycle times normally required for producing films, extruded and molded articles, and coatings.

In this disclosure, a number of terms and abbreviations are used. The following definitions are provided.

"Poly(3-hydroxybutyrate-co-3-hydroxyoctanoate)" which is also known as "poly-3-hydroxy(butyrate-co-octanoate)" is abbreviated P3HBO.

"Poly-3-hydroxy(butyrate-co-hexanoate)" which is also known as "poly-3-hydroxy(butyrate-co-hexanoate)" is abbreviated P3HBH.

"Polyhydroxyalkanoate" is abbreviated PHA.

"Polyhydroxybutyrate" is abbreviated PHB.

Polyhydroxyalkanoates

Polyhydroxyalkanoates ("PHA"s) of this invention include naturally derived polymers such as polyhydroxybutyrate (PHB), including homopolymers of 3-hydroxybutyrate and 4-hydroxybutyrate. They also include copolymers of PHB with hydroxy acids, for example copolymers of PHB with 3-hydroxyhexanoate, 3-hydroxyoctanoate, or longer chain hydroxy acids (e.g. $C_9$–$C_{12}$ hydroxy acids) and copolymers thereof. PHAs of this invention can also be synthetically derived from hydroxy carboxylic acids. Furthermore, the PHA can be predominantly of R(−) configuration, predominantly of S(+) configuration, or a random, block, or other combination of R(−) and S(+) configuration. As will be understood by the skilled artisan, the R(−) and S(+) isomers refer to the ability of the repeat unit of the polymer to rotate plane polarized light in the counterclockwise or clockwise direction, respectively. A racemic copolymer consists of both R(−) and S(+) repeat units within the polymer which can be arranged in any combination, including random or block configurations.

Preferred examples of polyhydroxyalkanoate copolymers used in this invention are poly-3-hydroxy(butyrate-co-octanoate) (y=3) (P3HBO)

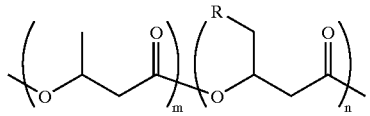

and poly-3-hydroxy(butyrate-co-hexanoate) (y=1) (P3HBH). These block copolymers have the generalized structure shown below.

m=0.7–0.97 and n=0.3–0.03, where m+n=1.0

In general, block copolymers can be prepared having various architectures. For example, an A-B diblock copolymer has a block of polymer A segments coupled to a block of B polymer segments. An A-B-A triblock copolymer has a block of B segments coupled to a block of A segments at each of its terminal ends. An -(A-B)$_n$- multiblock copolymer has alternating sequences of A and B segments where n is a positive integer greater than 1. Especially preferred are random block copolymers in which the PHB segments comprise from 85 to about 95 weight percent of the copolymer. For use in the present invention, PHAs have a weight average molecular weight of about 600,000 to greater than 1,000,000; the number average molecular weight ranges from about 280,000 to 500,000 grams/mole.

PHAs are generally difficult to process by conventional melt processes into films, fibers, filaments, rods, tubes or other forms having physical integrity. Conventional melt processes include continuous melt extrusion processes, cast film extrusion, blown film extrusion, melt spinning processes and other methods generally known to those skilled in the art. By "polymer difficult to melt process", it is meant that the polymer exhibits an effective melt strength and/or set time that detracts from the ability to form products having physical integrity by a conventional melt extrusion process.

The "effective melt strength" refers to the resistance of a molten polymer to be drawn-down to a desired dimension such as thickness (in the case of films), or diameter or denier (in the case of fibers or filaments). A polymer having a low effective melt strength is unable to withstand the minimum strain that is required to draw the polymer melt to a desired dimension. For example, the polymeric material may exhibit instabilities such as breakage, sagging or draw resonance. The resultant products tend to be highly non-uniform in physical integrity.

The "set time" refers to the time period required, under a given set of process conditions, for the molten polymer material to achieve a substantially non-tacky or non-sticky physical state. The set time is important because blocking may occur if the polymer does not set within a suitable time during processing. Thus, the polymeric material having residual tack may stick to itself and/or to processing equipment even after cooling to room temperature or below. Such residual tack may restrict the speed at which the product can be processed or prevent the product from being collected in a form of suitable quality.

The set time is influenced by the polymer material and the processing equipment and conditions. In general, the set time should be on the order of seconds under conventional process conditions. Such conditions typically include temperatures ranging from that of chill rolls, such as are known in the art, to the melt temperature of the material being processed, which may be up to about 150° C., (preferably 120 to 135° C.). In general, longer process cycle times (e.g. from the point of melt extrusion to the point of take-up of collection) tend to accommodate longer set times.

The term "tack" or "tackiness" is known to those skilled in the art to mean sticky or the amount of stickiness. Tack is generally a subjective measurement made by touching the film surface with a finger. If the surface is "tacky", or sticky, then it has the property of "tack". Tack may be measured subjectively by means of many scales, but to illustrate the concept, fly paper may be considered the high point of the scale with a Teflon® sheet (polytetrafluoroethylene) (from E. I. du Pont de Nemours and Company, Wilmington, Del.) as having no tack. For the purpose of this invention, tack was subjectively measured by a single operator after pressing a film of the appropriate polymer blend between two sheets of Teflon® coated aluminum foil five times. After the fifth pressing, the sample film was cooled for 10 seconds at room temperature, and the relative force required to first remove the film from the Teflon® sheets was noted. Additionally, the force required to peel the film apart from itself after folding it over on itself was also subjectively monitored along with the force required to peel the polymer from the gloves of the operator. A result of "no tack" was recorded when no apparent additional force was required to remove the film from the Teflon® sheet or from itself after folding. The subjectively graded scale of "slight tack" to "moderate tack" indicates that more force was required to pull the film from the Teflon® sheet and itself in each respective category. The category of "tacky" indicates that generally the film was extremely difficult to remove from the Teflon® sheet and virtually impossible to separate from itself after folding when cooled under the standard time of 10 seconds.

Nucleants

"Nucleants" or "nucleating agents" are compounds used to artificially introduce nucleation sites for the process of polyhydroxyalkanoate crystallization from the molten state. A description is set forth in U.S. Pat. No. 5,534,616, starting at column 1, line 36. The reference is hereby incorporated by reference. Nucleants help to compensate for the slow rate of crystallization of many PHAs due to their low nucleation density. The preferred amount of nucleant in the composition is from about 1% to about 10%, based on the total weight of the composition. The nucleant in the preferred composition is polyhydroxybutyrate and is used in an amount ranging from about 0.005% to about 20%, more preferably from about 0.05% to about 10% and most preferably from about 0.5% to about 5%, based on the total weight of the composition.

Plasticizers

Plasticizers are used in the instant composition to modify the mechanical properties of products formed and to improve the processability of the composition. In general, a plasticizer tends to lower the modulus and tensile strength, and to increase the ultimate elongation, impact strength, and tear strength of the polymeric product. The plasticizer may also be used to lower the melting point of the composition to thereby enable melt processing at lower temperatures. In this invention the plasticizer is used to lower the glass transition temperature as an aid to increase the rate at which a non-tacky product will be attained.

External plasticizers known in the art include glycerol, ethylene glycol, and low molecular weight polyethylene glycols. Preferred plasticizers for the PHAs examined include di(2-ethylhexyl)(dioctyl)maleate, paraffin, dodecanol, olive oil, soybean oil, polytetramethylene glycols, methyl oleate, n-propyl oleate, tetrahydofurfuryl oleate, epoxidized linseed oil, 2-ethylhexyl epoxytallate, glycerol triacetate, methyl linoleate, dibutyl fumarate, methyl acetyl ricinoleate, acetyl tri(n-butyl) citrate, acetyl triethyl citrate, tri(n-butyl) citrate, triethyl citrate, bis(2-hydroxyethyl) dimerate, butyl ricinoleate, glyceryl tri-(acetyl ricinoleate), methyl ricinoleate, n-butyl acetyl rincinoleate, propylene glycol ricinoleate, diethyl succinate, diisobutyl adipate, dimethyl azelate, di(n-hexyl) azelate and tri-butyl phosphate. Most preferred plasticizers for the PHAs examined include methyl laurate and di-n-butyl maleate. The preferred amount of plasticizer in the composition is from about 5% to about 35%, and more preferably from about 12% to about 20%, based on the total weight of the composition.

Methods of Melt Extrusion

Conventional melt extrusion methods are used to produce extruded and molded articles of the present invention. Such melt extrusion methods involve blending of polymeric components followed by extrusion of the blend. In a preferred embodiment, the strands of PHA polymer are extruded at about 120–160° C., more preferably from 130–145° C., through the die plate into a water bath having a temperature of about 30–40° C.

In a preferred melt extrusion process of the present invention, pellets of the polymeric components are first prepared. The PHA nucleant and plasticizer can be first dry blended and then melt mixed in the film extruder itself. Alternatively, if insufficient mixing occurs in the melt extruder, the ingredients can be first dry blended and then mixed in a pre-compounding extruder followed by pelletization prior to film melt extrusion.

The PHA films of the present invention may be processed using conventional methods and are used for producing single or multilayer films on conventional film-making equipment. The cast or blown film extrusion methods used to make the PHA films of the present invention are more fully described in U.S. Pat. No. 6,027,787, hereby incorporated by reference, and described in Plastics Extrusion Technology—$2^{nd}$ Ed., by Allan A. Griff (Van Nostrand Reinhold, 1976). In a preferred embodiment, the PHA polymer continuous film is extruded at about 120–160° C., more preferably from 120–140° C., onto rollers having a temperature of about 30–45° C., more preferably of about 40° C.

"Film" refers to a continuous piece of extruded material having a high length to thickness ratio and a high width to thickness ratio. While there is no requirement for precise upper or lower limits of thickness, a preferred film thickness of the present invention is from about 0.05 to about 50 mil, and a more preferred film thickness is from about 0.5 to about 15 ml. The films of the present invention can comprise one, two or more layers.

The PHA compositions of the present invention can also be made into certain selected molded articles by conventional injection molding techniques.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

The meaning of abbreviations is as follows: "h" means hour(s), "min" means minute(s), "sec" means second(s), "d" means day(s), "mL" means milliliter(s), "L" means liter(s), "ft" means foot or feet, "lb" means pound(s) and "g" means gram(s).

General Methods

Poly-3-hydroxy(butyrate-co-octanoate) (P3HBO) was obtained from Procter and Gamble Company, Inc. (Cincinnati, Ohio). Poly-3-hydroxy(butyrate-co-hexanoate) (P3HBH) was obtained from Proctor and Gamble Company, Inc. (Cincinnati, Ohio) (Jiangmen Center for Biotechnology Development and Tsinghua University (China). PHB was supplied by Aldrich Chemical Company, Inc. (St. Louis, Mo.).

Example 1

Identification of "Active" Nucleant and Plasticizer Combinations

Screening of nucleant and plasticizer combinations was conducted as follows: a melt blend of the nucleant PHB and a PHA, specifically, either P3HBO or P3HBH were prepared by first tumble blending powders of the appropriate amounts of PHB and either P3HBO or P3HBH. Generally, 1 wt % PHB (0.75 g) was added to the P3HBO (74.25 g) polymer and 3 wt % PHB (2.25 g) was added to the P3HBH (72.75 g) polymer. (Percent nucleant addition was determined by anti-stick performance in preliminary experiments.) After tumble blending the appropriate ingredients, the powder was fed into a small 16 mm PRISM twin screw extruder set to a maximum temperature of 155° C. The polymer was melt extruded through a single hole 3/16-inch die into a water bath and onto a water-cooled "non-stick" belt. The polymer tended to stick to the belt and was cut into 2 to 3 ft lengths and draped over a rack to allow time for crystallization to occur. After 20 min to 1 hr, the polymer strands had crystallized sufficiently to be hand cut with scissors or run through a blade cutting machine to produce small (2 to 8 mm long) pellets. The pellets were then pressed into film under the following conditions: press temperature (140° C.); pressure (1000 psi); minutes in press (2 min); cooling temperature (25° C.). The resulting film was then cut into 2 to 5 mm wide strips to be used in the screening process.

Because good mixing facilities were not available for blending very small quantities of polymer and plasticizer, the following methodology was developed and followed to screen melt blends of polymer, nucleant and plasticizer. Into a small test tube was added 0.4 g of the desired plasticizer. The test tube containing the plasticizer was placed into a Wood's metal bath heated to 160° C. and held there for 10 min. After the plasticizer was pre-heated, 1.6 g of the appropriate PHA film strips containing the PHB nucleant (prepared as described above) were added to the test tube. The entire content of the tube was then heated at 160° C. for an additional 50 min. The tube was then removed from the heating bath and allowed to cool at room temperature for at least 1 h. The resulting polymer blend was removed from the test tube (breaking the tube if necessary). The resulting polymer and any liquid contents were put onto a Teflon® coated aluminum foil sheet (commercially available from E. I. du Pont de Nemours and Company, Wilmington, Del.) and pressed into a film. The film was then removed from the sheet, folded over onto itself and pressed again into a film. The film pressing process was repeated 5 times to ensure good blending of the three ingredients and to evaluate the effectiveness of the nucleant plasticizer combination. Film processing conditions were generally as follows: press temperature (140° C.); press pressure (1000 psi); press time (2 min); cool temperature (room temperature); cool pressure (5 lb plate); and cool time (10 sec). Immediately after the final film was pressed and cooled for 10 sec, the sample was peeled from the Teflon® coated sheet and evaluated for tack to the Teflon® coated sheet, to itself, and to the operator's gloves. If the sample exhibited no stickiness or tackiness, as defined herein, to any of the surfaces to which it was exposed, it was given a rating of "no tackiness". All other ratings indicate some level of tack. The sample was then wiped of any remaining plasticizer and weighed. Percent incorporation of plasticizer was determined by comparing final polymer weight to theoretical weight and back calculating plasticizer content assuming only plasticizer loss. A sample calculation follows:

Ingredients added:
1.6 g (nucleant+polymer) as film
0.4 g plasticizer
Total ingredients processed=1.60 g+0.40 g=2.00 g
Theoretical % plasticizer=(0.40 g/2.00 g)×100%=20%

General Example:
Actual final weight of film=X g
Assumed final weight of plasticizer=X g−1.60 g=Y g
Actual % plasticizer=(Y g/X g)×100%
Specific Example:
Actual final weight of film=1.86 g
Assumed final weight of plasticizer=1.86 g−1.60 g=0.26 g
Actual % plasticizer present=(0.26 g/1.86 g)×100%=14%

It should be noted that in no case was a film of less than 1.60 g ever produced, indicating that in all cases some plasticizer was incorporated into the polymer.

Table 1 (examples 1–44) summarizes the nucleant and plasticizer screening done with both P3HBO and P3HBH, respectively, that showed results of no tack. Table 2 (examples 45–60) summarizes comparative examples that do exhibit tack. The abbreviation Tg used in Table 1 and Table 2 represents glass transition temperature (° C.);

In general, for those samples that produced a rating of "no tackiness", the samples that retained more plasticizer tended to perform better (show even less tack) than those that retained less plasticizer. Occasionally, tack was still evident when some films were cooled at room temperature. If these same films were cooled at 65° C., some of them then exhibited no tack. These films were given a rating of no-tack; however, they are considered inferior to those that exhibit no tack after 10 sec of room temperature cooling. The samples that exhibit rapid elimination of tack were considered to be candidates for melt processing via injection molding, film extrusion and fiber extrusion.

Example 2

Demonstration of Continuous Melt Extrusion of Poly-3-hydroxy(butyrate-co-hexanoate) into Strand and On-Line Pelletizing Blending of Ingredients (di-n-butylmaleate plasticizer): Into a 35 gallon fiberpak was added 15088.6 g of powdered P3HBH, and 588.5 g of powdered PHB. To this powder mixture was slowly added 3923.0 g of di-n-butylmaleate at such a rate that the liquid plasticizer was immediately imbibed into the powder. The fiberpak was then placed onto a barrel tumbler and tumbled for six h to ensure good mixing.

Extrusion of Polymer Strand and Pelletizing (di-n-butylmaleate plasticizer): After tumbling the polymer ingredients as described, the resulting mixture was fed into a 30 mm twin screw extruder at a rate of approximately 10 lb/h. The extruder temperatures were set to maintain a gradient barrel temperature of 120° C. to 160° C. Screw RPM was maintained at 100. The resulting molten polymer was extruded through a 3/16 inch die into a 12-foot long water trough kept at a temperature of 34° C. to 38° C. The polymer was cut at a rate of 6 to 8 ft/min and fed directly into a Conair polymer cutter. A total of 40.9 lb of pellets were collected.

The resulting polymer strand exhibited some tacky behavior within the first 6 feet of the quench trough. After the strand became non-tacky in the water trough, the polymer exhibited no tacky behavior at any time during the processing operation or in subsequent processing operations.

Example 3

Demonstration of Continuous Melt Extrusion of Poly-3-hydroxy(butyrate-co-hexanoate) into Strand and On-Line Pelletizing Blending and Extrusion of Polymer Strand and Pelletizing (methyl laurate plasticizer): In a process similar to that described for polymer blended with di-n-butylmaleate in Example 2, the following ingredients were blended: 11,793 g of P3HBH, 459.5 g of PHB, and 3063 g of methyl laurate. The resulting mixture was then fed into a 30 mm extruder as previously described set to maintain a gradiated barrel temperature between 120° C. to 160° C. The screw RPM was maintained at 100 and polymer was extruded through a ³⁄₁₆ inch die into a 12-foot water trough maintained at 34° C. to 38° C. The polymer was cut at a rate of approximately 12 ft/min by a Conair polymer cutter. The polymer quench time (the time at which no further tackiness was observed) was approximately 25 sec. A total of approximately 32 lb of non-tacky pellets were collected. It was noted that methyl laurate promoted faster quench times, thus allowing faster cutting rates.

Example 4

Demonstration of Continuous Cast Film Production Using Poly-3-hydroxy(butyrate-co-hexanoate) with Methyl Laurate Plasticizer P3HBH pellets plasticized with methyl laurate and nucleated with PHB as prepared in the previous examples were fed into a single screw extruder equipped with a 14 inch film die and set to maintain a gradiated barrel/die temperature of 140° C. to 120° C. The resulting polymer extrudate was cast onto 12 inch diameter stainless steel rolls set at a temperature of 40° C. The extruded film was taken up onto the quench rolls and then onto packaging rolls at speeds ranging from 2 ft/min to 13 ft/min to produce films of thicknesses ranging from 1 mil to 10 mil. The film exhibited no tack and the following properties summarized in Table 3, (measured according to ASTM D 882-95a—Standard Test Method for Tensile Properties of Thin Plastic Sheeting):

TABLE 3

| Direction | Thickness (mil) | Young's Mod. (MPa) | Strain at Break (%) | Stress at Break (MPa) | Toughness (J/in³) |
|---|---|---|---|---|---|
| Machine | 1.7 | 187 | 562 | 10.3 | 745 |
| Cross | 1.7 | 147 | 524 | 8.2 | 623 |

TABLE 1

| EX. # | COMPOSITION (+NUCLEANT) | PLASTICIZER | WT % PLASTICIZER | FILM QUALITY |
|---|---|---|---|---|
| 1 | PHBO/PHB (99:1) | di(2-ethylhexyl)(dioctyl)maleate | 12 | no tackiness |
| 2 | PHBO/PHB (99:1) | paraffin | 3.6 | no tackiness |
| 3 | PHBO/PHB (99:1) | dodecanol | 7 | no tackiness |
| 4 | PHBO/PHB (99:1) | polyethylene glycol 600 | 7 | no tackiness |
| 5 | PHBO/PHB (99:1) | polyethylene glycol 8000 | 11 | no tackiness |
| 6 | PHBO/PHB (99:1) | olive oil | 2.4 | no tackiness |
| 7 | PHBO/PHB (99:1) | soybean oil | 4.8 | no tackiness |
| 8 | PHBO/PHB (99:1) | TERETHANE 650 | 14 | no tackiness |
| 9 | PHBO/PHB (99:1) | methyl oleate | 14 | no tackiness |
| 10 | PHBO/PHB (99:1) | n-propyl oleate | 12 | no tackiness |
| 11 | PHBO/PHB (99:1) | tetrahydrofurfuryl oleate | 13 | no tackiness |
| 12 | PHBO/PHB (99:1) | epoxidized linseed oil | 9 | no tackiness |
| 13 | PHBO/PHB (99:1) | 2-ethylhexyl epoxytallate | 11 | no tackiness |
| 14 | PHBO/PHB (99:1) | dibutyl fumarate | 20 | no tackiness |
| 15 | PHBO/PHB (99:1) | glycerol triacetate | 18 | no tackiness |
| 16 | PHBO/PHB (99:1) | methyl laurate | 12 | no tackiness |
| 17 | PHBO/PHB (99:1) | methyl linoleate, 75% | 9 | no tackiness |
| 18 | PHBO/PHB (99:1) | di-n-butyl maleate | 17 | no tackiness |
| 19 | PHBO/PHB (99:1) | methyl acetyl ricinoleate | 11 | very good |
| 20 | PHBO/PHB (99:1) | acetyl tri(n-butyl) citrate | 19 | very little tack |
| 21 | PHBO/PHB (99:1) | acetyl triethyl citrate | 20 | very little tack |
| 22 | PHBO/PHB (99:1) | tri(n-butyl) citrate | 20 | very little tack |
| 23 | PHBO/PHB (99:1) | triethyl citrate | 20 | very little tack |
| 24 | PHBO/PHB (99:1) | bis(2-hydroxyethyl) dimerate | 7 | very little tack |
| 25 | PHBO/PUB (99:1) | butyl ricinoleate | 19 | OK |
| 26 | PHBO/PHB (99:1) | glyceryl tri-(acetyl ricinoleate) | 6 | OK |
| 27 | PHBO/PHB (99:1) | methyl ricinoleate | 18 | OK |
| 28 | PHBO/PHB (99:1) | n-butyl acetyl ricinoleate | 13 | OK |
| 29 | PHBO/PHB (99:1) | propylene glycol ricinoleate | 17 | OK |
| 30 (control) | PHBO/PUB (99:1) | | | high tack |
| 31 | PHBH/PHB (97:3) | paraffin | 2.4 | no tackiness |
| 32 | PHBH/PHB (97:3) | dodecanol | 8 | no tackiness |
| 33 | PHBH/PHB (97:3) | dibutyl fumarate | 17 | non stick |
| 34 | PHBH/PHB (97:3) | methyl laurate | 18 | non stick |
| 35 | PHBH/PHB (97:3) | methyl linoleate | 17 | non stick |
| 36 | PHBH/PHB (97:3) | di-n-butyl maleate | 19 | non stick |
| 37 | PHBH/PHB (97:3) | methyl ricinoleate | 18 | non stick |
| 38 | PHBH/PHB (97:3) | diethyl succinate | 17 | non sticky |
| 39 | PHBH/PHB (97:3) | diisobutyl adipate | 19 | non tacky |
| 40 | PHBH/PHB (97:3) | dimethyl azelate | 19 | non tacky |
| 41 | PHBH/PHB (97:3) | di(n-hexyl) azelate | 17 | non tacky |
| 42 | PHBH/PHB (97:3) | tri-butyl phosphate | 20 | non-tacky |
| 43 | PHBH/PHB (97:3) | di(2-ethylhexyl)(dioctyl)maleate | 17 | OK |
| 44 | PHBH/PHB (97:3) | TERETHANE 650 | 15 | OK |

TABLE 2

| EX. # | COMPOSITION (+NUCLEANT) | PLASTICIZER | WT % PLASTICIZER | FILM QUALITY |
|---|---|---|---|---|
| 45 | PHBO – CONTROL | | | tacky |
| 46 | PHBH – CONTROL | | | tacky |
| 47 | PHBH/PHB (97:3) | | | tacky |
| 48 | PHBO/PHB (97:3) | | | tacky |
| 49 | PHBO/MICROCRYSTALLINE CELLULOSE (97:3) | | | tacky - removed easily from teflon when hot - tacky as it cooled |
| 50 | PHBO/NUCREL 1214 (95:5) | | | tacky |
| 51 | PHBO/paraffin (95:5) | | | worse than control |
| 52 | PHBO/PO2G (95:5) | | | tacky |
| 53 | PHBO/POLYETHYLENE GLYCOL 8000 (97:3) | | | slightly tacky |
| 54 | PHBO/POLYLACTIC ACID (97:3) | | | tacky |
| 55 | PHBO/SURLYN 8020 (95:5) | | | tacky |
| 56 | PHBH/PHB (97:3) | butyl oleate | 8 | tacky |
| 57 | PHBH/PHB (97:3) | ditridecyl adipate | 15 | slightly tacky |
| 58 | PHBH/PHB (97:3) | dodecanol | 8 | slightly tacky |
| 59 | PHBH/PHB (97:3) | epoxidized linseed oil | 13 | slightly tacky |
| 60 | PHBH/PHB (97:3) | olive oil | 2 | slightly tacky |
| 61 | PHBH/PHB (97:3) | soybean oil | 3 | tacky |
| 62 | PHBH/PHB (97:3) | triethyl citrate | 18 | tacky |
| 63 | PHBO/PHB (99:1) | chloroparaffin, 50% Cl | 9 | tacky |
| 64 | PHBO/PHB (99:1) | n-butyl stearate | 6 | some tackiness |

What is claimed is:

1. A composition consisting essentially of:
(a) from 60% to 94.5% by weight of a polyhydroxyalkanoate formula I copolymer of $$\left\{\begin{array}{c}O\\\parallel\\O\end{array}\right\}_m \left\{\begin{array}{c}R\\|\\O\end{array}\begin{array}{c}O\\\parallel\end{array}\right\}_n$$ Formula I wherein R is $CH_3(CH_2)_y$;
y is 1, 2, or 3;
m is 0.7 to 0.97;
n is 0.3 to 0.03; and
m+n=1;

(b) from 0.5% to 5.0% by weight of a nucleating agent consisting of poly(3-hydroxybutyrate)homopolymer; and (c) from 5.0% to 35.0% by weight of a plasticizer selected from the group consisting of di-n-butyl maleate, methyl laureate, dibutyl furnarate and dioctyl maleate.

* * * * *